US012559326B2

(12) United States Patent
Gariglio

(10) Patent No.: US 12,559,326 B2
(45) Date of Patent: Feb. 24, 2026

(54) OPTIMIZATION BENCH FOR GLASS PLATES AND METHOD FOR POSITIONING GLASS PLATES USING THIS BENCH

(71) Applicant: FORVET S.P.A. COSTRUZIONE MACCHINE SPECIALI, Volvera (IT)

(72) Inventor: Davide Gariglio, Volvera (IT)

(73) Assignee: BAVELLONI S.P.A., Lentate sul Seveso (IT)

( * ) Notice: Subject to any disclaimer, the term of this patent is extended or adjusted under 35 U.S.C. 154(b) by 307 days.

(21) Appl. No.: 18/263,232

(22) PCT Filed: Jan. 27, 2022

(86) PCT No.: PCT/IB2022/050705
§ 371 (c)(1),
(2) Date: Jul. 27, 2023

(87) PCT Pub. No.: WO2022/162570
PCT Pub. Date: Aug. 4, 2022

(65) Prior Publication Data
US 2024/0116722 A1     Apr. 11, 2024

(30) Foreign Application Priority Data

Jan. 27, 2021     (IT) ........................ 102021000001631

(51) Int. Cl.
*B65G 49/06*        (2006.01)
*B65G 15/12*        (2006.01)
(Continued)

(52) U.S. Cl.
CPC ........... *B65G 49/064* (2013.01); *B65G 15/12* (2013.01); *B65G 23/26* (2013.01); *C03B 35/142* (2013.01); *B65G 2201/022* (2013.01)

(58) Field of Classification Search
CPC ........ B65G 15/12; B65G 15/50; B65G 23/26; B65G 49/064; B65G 2201/022; C03B 35/142; C03B 2225/02
See application file for complete search history.

(56) References Cited

U.S. PATENT DOCUMENTS

| | | | |
|---|---|---|---|
| 6,854,583 B1 * | 2/2005 | Horn | B65G 49/068 |
| | | | 198/346.2 |
| 7,909,159 B1 * | 3/2011 | Zats | B65G 21/10 |
| | | | 198/606 |

(Continued)

FOREIGN PATENT DOCUMENTS

| | | |
|---|---|---|
| EP | 3184473 A1 | 6/2017 |
| KR | 20140029746 A | 3/2014 |

OTHER PUBLICATIONS

International Search Report and Written Opinion of International Application No. PCT/IB2022/050705, mailed on Apr. 29, 2022, 11 pages.

*Primary Examiner* — Gene O Crawford
*Assistant Examiner* — Keith R Campbell
(74) *Attorney, Agent, or Firm* — Heslin Rothenberg Farley and Mesiti P.C.; Victor A. Cardona, Esq.

(57) ABSTRACT

An optimization bench for glass plates is configured to move the plates in a longitudinal direction of the bench in order to arrange the plates in positions suitable to achieve optimal occupation of the available area on the bench. The bench includes a plurality of belt conveyors parallel to each other, selectively driven by motor means through a plurality of electrically operated clutches which are respectively associated with the belt conveyors. An electronic controller is configured to convey each plate by activating only the belt conveyors on which the plate rests, until all plates are arranged in an optimized manner on the bench area.

11 Claims, 7 Drawing Sheets

(51) Int. Cl.
    *B65G 23/26*        (2006.01)
    *C03B 35/14*        (2006.01)

(56)               References Cited

U.S. PATENT DOCUMENTS

| | | | |
|---|---|---|---|
| 8,167,120 B2 * | 5/2012 | Russell | B65G 47/54 |
| | | | 198/457.03 |
| 9,315,339 B2 * | 4/2016 | Gaillard | B65G 47/34 |
| 10,214,366 B2 * | 2/2019 | Milewski | B65G 15/12 |
| 2010/0038210 A1 * | 2/2010 | Cox | B65G 47/71 |
| | | | 198/460.1 |

* cited by examiner

OPTIMIZATION BENCH FOR GLASS PLATES AND METHOD FOR POSITIONING GLASS PLATES USING THIS BENCH

CROSS REFERENCE TO RELATED APPLICATIONS

This application is a national stage filing under Section 371 of International Application No. PCT/IB2022/050705, filed Jan. 27, 2022, published in English on Aug. 4, 2022, as WO 2022/162570 and which claims priority from Italian Patent Application No. 102021000001631 filed on Jan. 27, 2021 the entire disclosures of which are incorporated herein by reference.

FIELD OF THE INVENTION

The present invention relates to an optimization bench for glass plates, in particular a bench for optimizing the space occupied by glass plates in a glass plate transport system.

PRIOR ART

Transport systems are known which are used to move glass plates between two stations of a production plant, in which processing operations for the production of glass plates are carried out. These known glass plate transport systems present the problem of requiring optimal occupation of the available area, especially in the case of processes, such as tempering, which, in order to obtain a good quality of the process, require that plates of different sizes are spaced and arranged in a suitable manner.

In order to optimally arrange the plates, known glass plate transport systems comprise a feed table on which the glass plates to be moved are arranged, comprising first conveyor means for moving the glass plate in a longitudinal direction and second conveyor means for moving the glass plate in a transverse direction so as to arrange the glass plates on the feed table in appropriate positions for movement to the next processing station.

Known glass plate transport systems comprising a feeding table have problems of reliability, due to the complexity of implementation and management of the first and second conveyor means, which also cause high implementation and management costs, significant encumbrances and do not guarantee optimal occupation of the area available for arranging the glass plates.

A bench having the characteristics indicated in the preamble of claim 1 is known from U.S. Pat. No. 6,854,583 B1. This known device is complex and expensive and requires the use of conveyor devices each having its own drive system. An optimization bench is also described in EP 1 375 389 A1, but involves an even more complex conveyor system with a matrix of pivoting conveying rollers. Document U.S. Pat. No. 7,909,159 B1 shows a conveyor system for transporting industrial components, for example automotive body components, comprising a plurality of belt conveyors parallel to each other, each of which is adjustable in position both vertically and transversely, to adapt the group of belt conveyors to receive and support components having different configurations. Each belt conveyor has its own drive system. Such a conveyor system is not configured to optimise the distribution of a plurality of products in a given area.

OBJECT OF THE INVENTION

The purpose of the present invention is to solve the above-mentioned problems of the prior art by providing an optimization bench for glass plates which is reliable, which can be produced and operated at low cost, which is space-saving and able to achieve an optimal occupation of the area available for the glass plates.

SUMMARY OF THE INVENTION

The above and other purposes and advantages of the invention, as will result from the following description, are achieved with a glass plate optimization bench according to claim 1 and a method according to claim 10. Preferred embodiments of the present invention form the subject matter of the dependent claims.

It is understood that the appended claims form an integral part of the present description.

It will be immediately obvious that innumerable variations and modifications (e.g., with respect to shape, dimensions, arrangements and parts with equivalent functionality) can be made to what is described without departing from the scope of protection of the invention as reflected in the appended claims.

DETAILED DESCRIPTION OF THE INVENTION

The present invention will be best described by a preferred embodiment, provided by way of not-limiting example, with reference to the accompanying drawings, in which.

Figure 1:
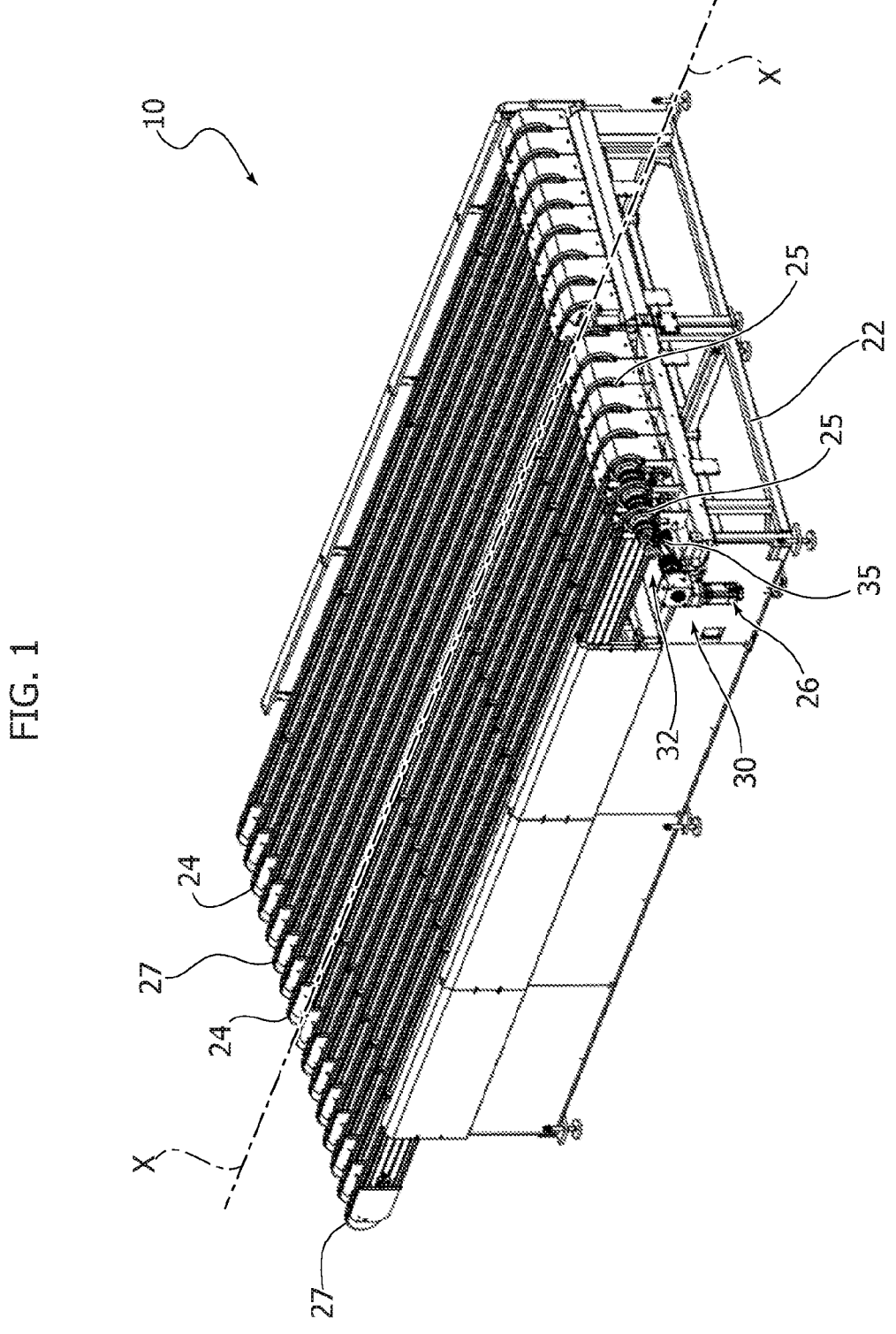
FIG. 1 shows a perspective view of a glass plate optimization bench according to the present invention.

Referring to the figures, the optimization bench 10 for glass plates according to the invention comprises a base 22 and conveyor means in the form of a plurality of belt conveyors 24, parallel to each other and extending in a horizontal longitudinal direction X-X of the bench. The belt conveyors 24 are configured for supporting and positioning a plurality of glass plates over the area available on the bench, so as to achieve optimal occupation of this area.

The belt conveyors 24 constituting the conveyor means can be selectively driven, individually or in groups, by drive means 26, 30 which will be described below, which in turn are controlled by an electronic controller E (FIG. 3), comprising one or more electronic units, to control and coordinate the movement of the plates on the optimization bench 10 so as to arrange the plates in the most suitable positions to obtain an optimal occupation of the available area.

As will be apparent from the description below, the belt conveyors 24 are therefore operable selectively, according to any criteria, i.e. also independently of each other, or in groups independent of each other, with the possibility of varying as desired which and how many conveyors make up each group of conveyors that are operated simultaneously and in synchronism.

The drive means comprise motor means, which in a preferred example comprise a single electric motor 26 and a transmission system 30. The belt conveyors 24 are driven by the electric motor 26 via respective electrically operated clutches 31, forming part of the transmission system 30, which are controlled by the electronic controller E, to make possible the aforementioned selective drive of the belt conveyors 24. Naturally, it would be also possible to provide more electric motors 26, each of which controls a respective sub-group of belt conveyors 24, by means of respective electrically operated clutches 31 controlled by the electronic controller E.

Each belt conveyor 24 comprises an endless belt engaged on two pulleys 25, 27 rotatably supported by the base 22.

Figure 4:
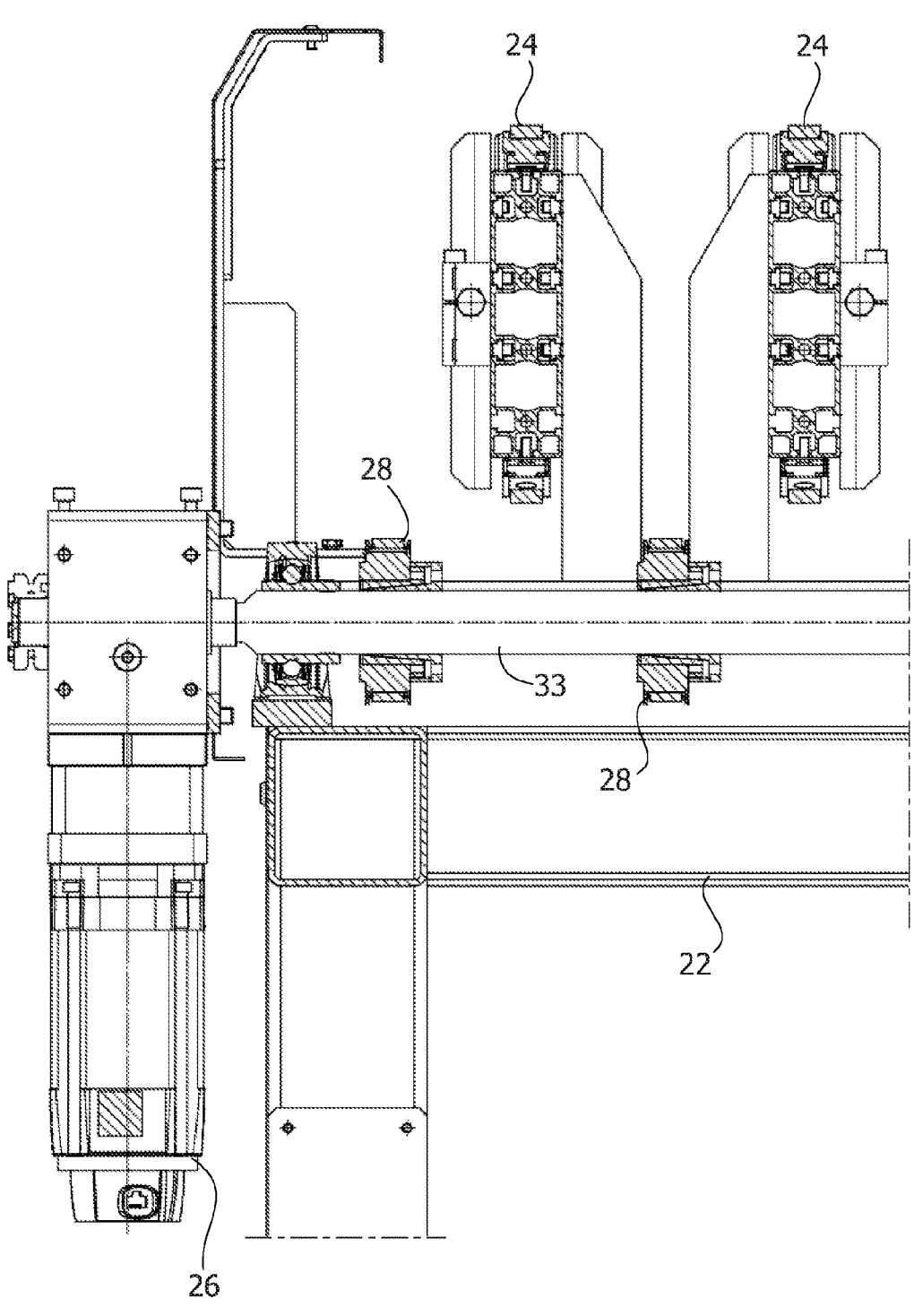
FIG. 4 shows a cross-sectional view of a part of an optimization bench for glass plates according to the present invention.

As indicated, in a preferred example there is provided a single electric motor 26 (FIG. 2) which drives (through a 90 degree gearbox in the example of FIG. 2) a drive shaft 33 arranged transversely to the longitudinal direction of the bench, which is rotatably supported by the base 22 by means of rolling bearings (see FIG. 4).

Preferably, the glass plate optimization bench 10 of the invention comprises a plurality of transmission units 32 respectively associated with the belt conveyors 24 and configured to control the rotation of the traction pulley 25 of each belt conveyor 24.

A plurality of pulleys 28 (two of which are visible in FIG. 4) are rigidly connected to the transverse shaft 33 at axially spaced positions.

Figure 2:
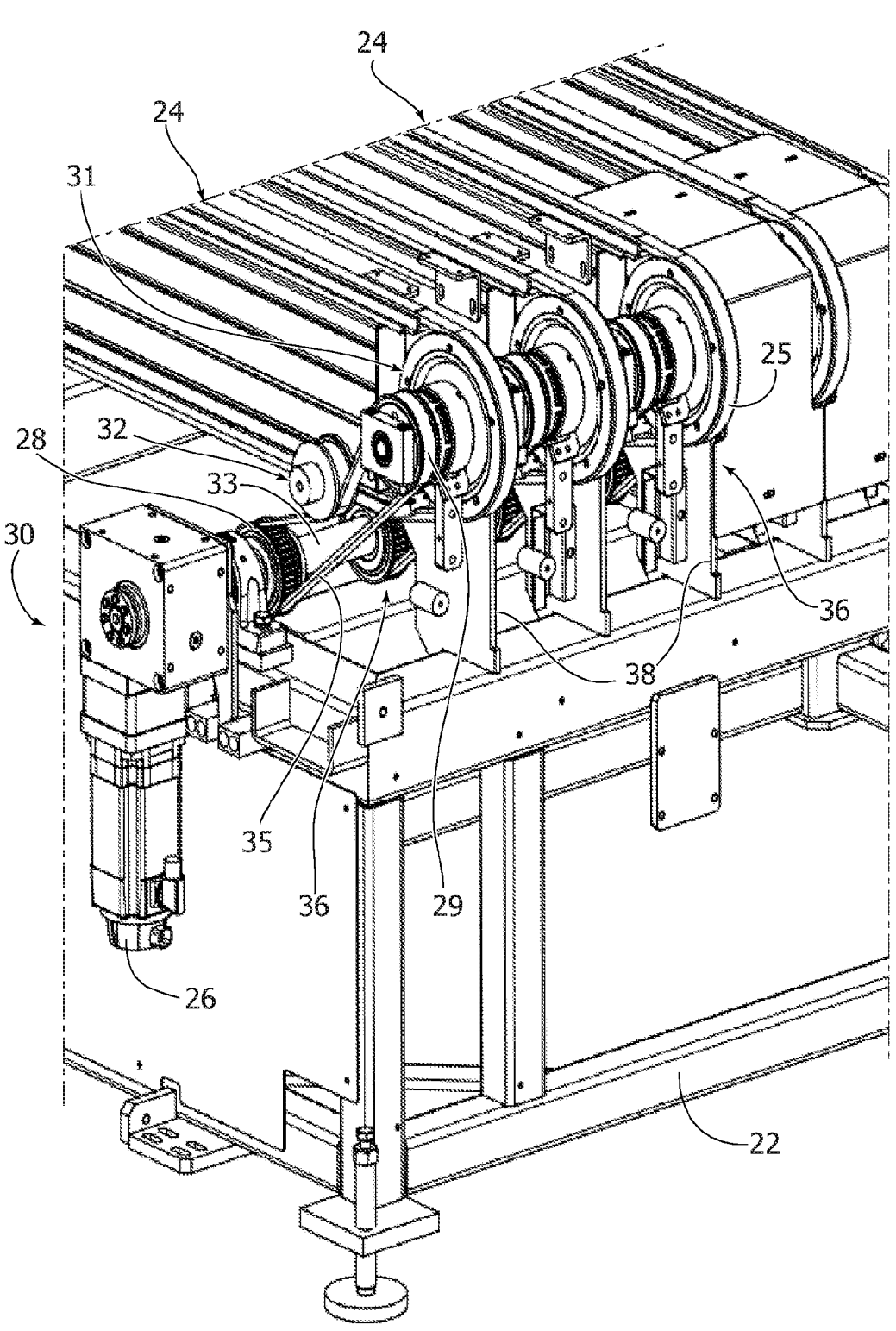
FIG. 2 shows a partial view of an optimization bench for glass plates according to the present invention in a working position.
Figure 3:
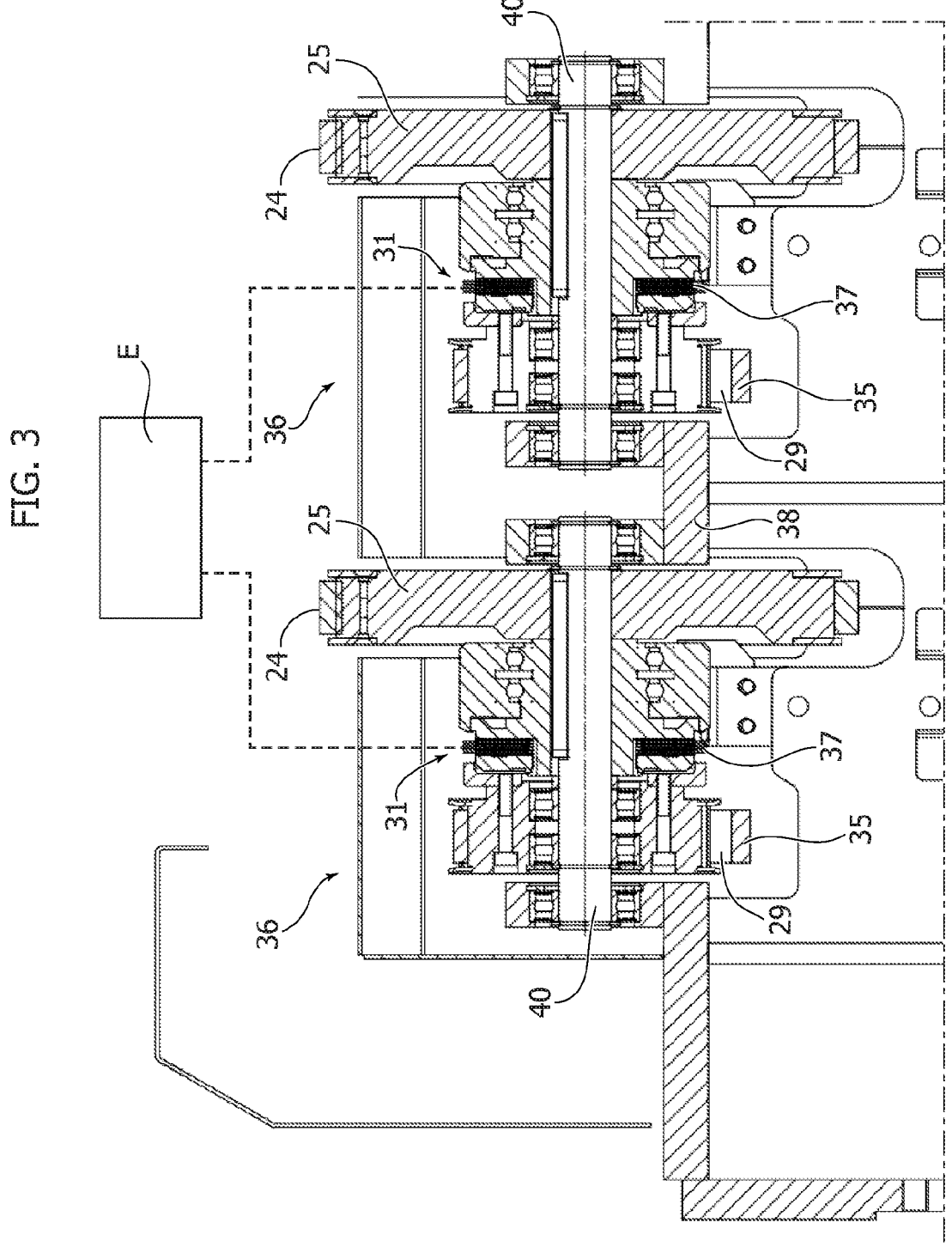
FIG. 3 shows a cross-sectional view of a detail of an optimization bench for glass plates according to the present invention.

Each transmission unit 32 associated with each belt conveyor 24 comprises a respective pulley 28 (of said pulleys 28 which are mounted on the shaft 33) and a respective drive pulley 29 pivotably supported on the base 22 and connected to the respective pulley 28 by a belt drive 35 (see FIGS. 2 and 3).

Referring to FIG. 3, in the illustrated example, each traction pulley 25 of a respective belt conveyor 24 is rigidly rotationally mounted on a respective shaft 40 which is rotatably supported, for example by means of rolling bearings (in the manner which will be described in detail below) on the base 22. Above each shaft 40 the respective drive pulley 29 of the respective drive unit 32 is also freely rotatably mounted, in the example by means of a rolling bearing.

Between the traction pulley 25 of each belt conveyor 24 and the respective drive pulley 29 there is axially interposed an electrically operated clutch 31 which, when activated, is capable of rotationally connecting the drive pulley 29 with the traction pulley 25.

The electrically actuated clutch 31 associated with each belt conveyor 24 may be of any known type. In the illustrated example, each clutch 31 is an electromagnetically actuated disc clutch. In accordance with a conventional technique for clutches of this type, the clutch comprises discs 37 (FIG. 3) that can be axially pushed into frictional contact with each other by the electromagnetic drive, such that a first portion of the clutch 31 that is rotationally connected with the respective shaft 40 (the portion on the righthand side of the discs 37 in FIG. 3) is rotationally connected with a second portion of the clutch that is rotationally connected with the pulley 29. Further constructional details of the clutch 31 are not described herein, as they may be of any known type and are not, taken alone, within the scope of the present invention.

Due to the arrangement described above, the electric motor 26, when activated, drives the rotation of the transverse shaft 33. The rotation of the shaft 33 is transmitted by the belt transmissions 35 to the pulleys 29. The rotation of each pulley 29 may be transmitted to the pulley 25 of the respective belt conveyor through activation of the respective clutch 31 by the electronic controller E. The electronic controller E is therefore capable of independently activating each belt conveyor 24.

As indicated above, the shaft 40 associated with each belt conveyor 24 is rotatably supported by the base 22, via rolling bearings. In the preferred example illustrated herein, the bearings rotatably supporting each shaft 40 are carried by supports 28 which are removably connected to the base 22. Thus, the group of pulleys, indicated as a whole by reference 36 in FIG. 3, which is associated with the traction pulley 25 of each belt conveyor 24, the group comprising the shaft 40 with the traction pulley 25, the pulley 29 and the clutch 31 interposed therebetween, constitutes a single unit removable as a whole from the base.

At the end of each belt conveyor 24 opposite to that illustrated in FIG. 3, the belt of the conveyor 24 is engaged on a pulley 27 (see FIG. 1) freely rotatably supported on the base. In the preferred example, the pulley 27 is also rigidly connected to a shaft mounted in a manner similar to the shaft 40 of FIG. 3, i.e. supported in rotation by means of rolling bearings carried on supports similar to the supports 28 of FIG. 3, which are removably connected (for example by screws) to the base 22.

Thanks to the aforementioned features, the entire assembly comprising each individual belt conveyor can be easily and quickly removed from the bench 10, in order to carry out maintenance operations or a replacement. In particular, it is possible to disengage the belt of the belt transmission 35 associated with an individual belt conveyor 24. After that, at each end of the belt conveyor it is possible to remove the connection between the base 22 and the supports 28 carrying the unit of traction pulley 25 and the unit of non-driving pulley 27. Having done so, the entire belt conveyor assembly can be removed by a sliding movement thereof in the direction X-X until it is removed from the bench.

Naturally, it would also be possible to provide more than one electric drive motor, each motor being able to control the selective activation of a group of belt conveyors 24 by activation of the respective clutches 31.

Figure 5:
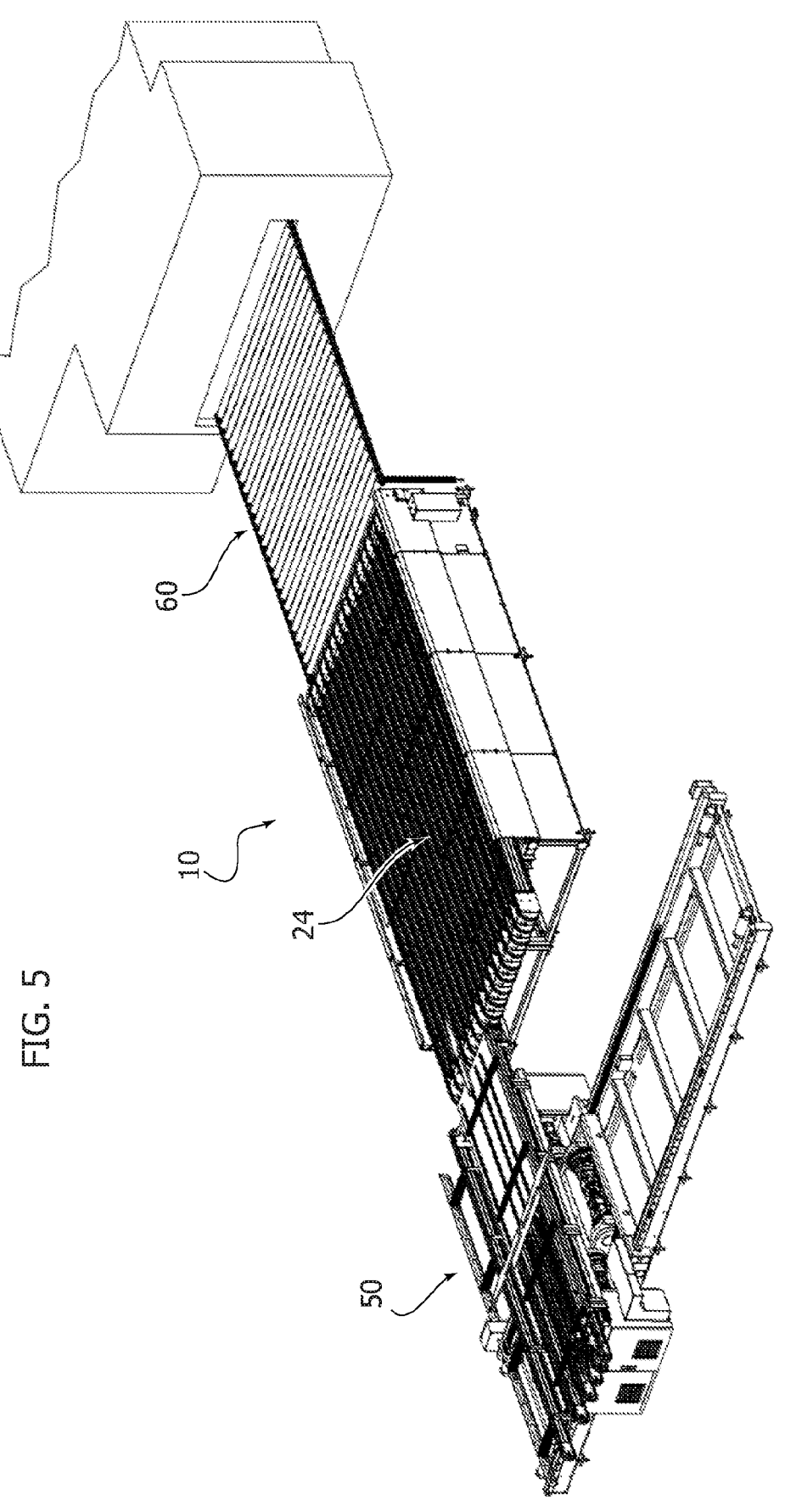
FIG. 5 shows a perspective view of a system comprising a glass plate optimization bench according to the present invention.

With reference to FIG. 5, a conveyor system comprising the optimization bench 10 for glass plates of the invention includes a plate loading system 50, which may be operated manually by an operator or in an atomized manner, and a plate unloading system 60, for example comprising a roller conveyor, for forwarding the plates, which have been positioned in an optimized manner on the optimization bench 10, to a subsequent station, for example a tempering furnace.

In the operation of the optimization bench 10 for glass plates according to the invention, the glass plates are loaded onto the optimization bench 10 using the plate loading system 50, operated manually or automatically. In a subsequent step, the optimization of the space occupied by the plates on the bench 10 is carried out by activating the electric motor 26 and activating the belt conveyors 24 on which the plate, or plates, to be moved are positioned, through activation of the corresponding clutches 31. The clutches are selected by the electronic controller to perform the optimal positioning of the glass plates on the optimization bench 10, through a movement of the plates in the X-X longitudinal direction.

FIGS. 6-9 are schematic plan views of the optimization bench 10, showing examples of distribution of a plurality of glass plates on the bench.

Figure 6:
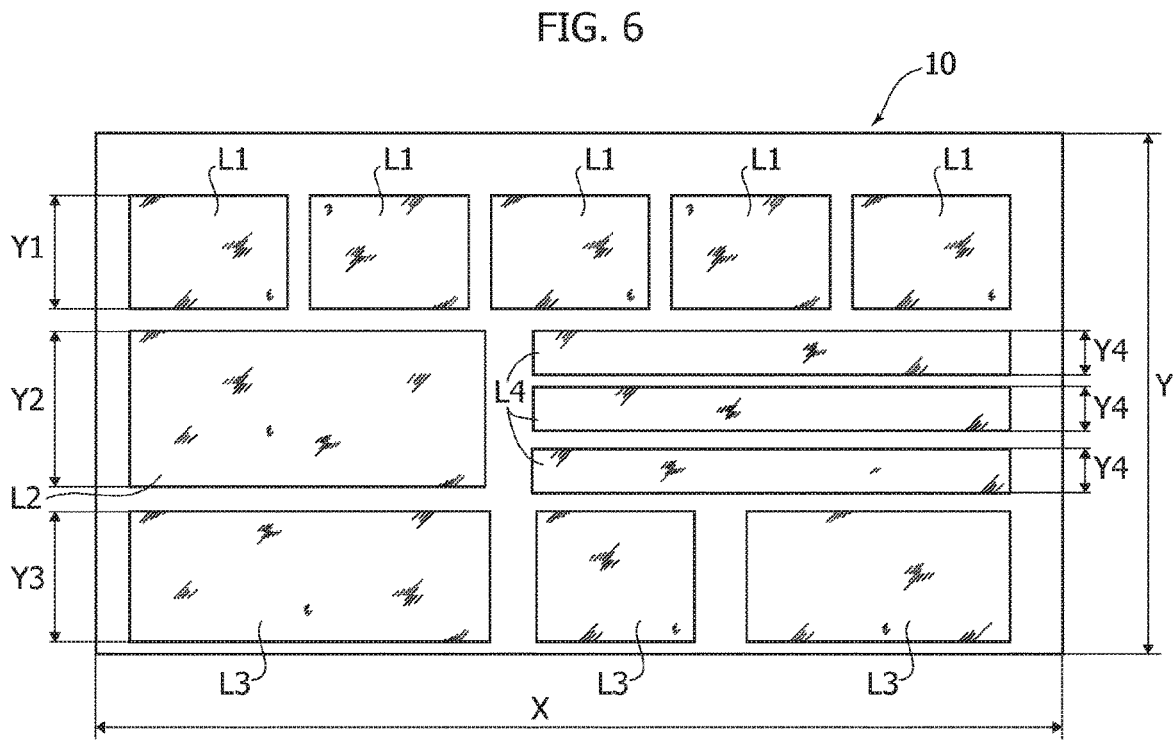
FIGS. 6-9 are schematic plan views of the optimization bench, showing examples of distributions of a plurality of glass plates on the bench.

In the example illustrated in FIG. 6, the glass plates are arranged on the bench in parallel "rows" of plates, extending in the direction of the longitudinal dimension X of the bench 10. The plates in each row all have the same transverse dimension, i.e. the dimension parallel to the transverse dimension Y of the bench 10.

In the specific example of FIG. 6, in the condition that the bench is totally occupied by plates, there is provided a first row of plates L1 all having the same transverse dimension Y1. A second row comprises a plate L2 having transverse dimension Y2 and three plates L4 arranged side by side, having widths Y4 less than Y2, so that the plates L4 occupy the space of one plate L2. A third row is occupied by plates L3 all having the same transverse dimension Y3.

The condition illustrated in FIG. 6 is achieved by placing the plates one at a time on the bench 10 by means of the plate loading system 50 or by means of any other loading system, for example by means of a manipulator robot. Once positioned on the bench 10, each plate is advanced on the table by activating only the belt conveyors on which it is supported. Thus, in the case of FIG. 6, the plates L1 progressively reach the position illustrated by activating only the belt conveyors on which the plates L1 are supported, and the same applies to the plates L2, L3 and L4.

In an embodiment, a plate magazine of any known type is arranged upstream of the optimization bench 10, in which the plates are stored by dividing them into groups according to their transverse dimension (with reference to the condition in which the plate will be supported on the bench). Means of any known type are associated with the magazine to detect the presence and type of plates in the magazine and to send an information to the electronic controller which is saved in a memory associated with the electronic controller E, to form a database of the available plates.

The electronic controller E is thus able to control the plate loading system in such a way as to position the plates in different positions with respect to the transverse direction Y of the bench 10, as a function of the transverse dimension of each plate, after which the electronic controller advances each plate placed on the table by operating only the belt conveyors on which the plate is supported (by activating the corresponding clutches 31), until the plates are arranged on the bench in parallel longitudinal rows, in which the plates forming each row all have the same predetermined transverse dimension (or a transverse dimension smaller than said predetermined transverse dimension).

Naturally, the electronic controller E can activate different groups of belt conveyors 24 simultaneously, to form different rows of glass plates simultaneously.

Again with reference to FIG. 6, in an actual implementation, the bench 10 has a longitudinal dimension X of 5700 mm and a transverse dimension Y of 2700 mm. In the example shown, plates L1, L2, L3 and L4 had transverse dimensions Y1, Y2, Y3 and Y4 of 750 mm, 1000 mm, 800 mm and 250 mm respectively. In the case of this example, bench 10 was configured to operate with plates having any transverse dimension starting from 200 mm and any longitudinal dimension starting from 450 mm.

The electronic controller E is programmed to read the database of plates in the magazine and to define, based on the transverse dimension of the plates, the arrangement of the "rows" of plates in order to optimise the area of the optimization table.

Once the optimization has been defined, the plate loading system starts to transfer the plates that are to make up each "row" to the bench 10 and the electronic controller E activates the belt conveyors 24 required to advance each glass plate on the bench to the desired position.

Due to the fact that the optimization bench has independent belts, it is possible to exploit a second optimization criterion, which makes it possible to optimally distribute glass plates with different transverse dimensions Y on the same "row" of the bench 10.

Figure 7:
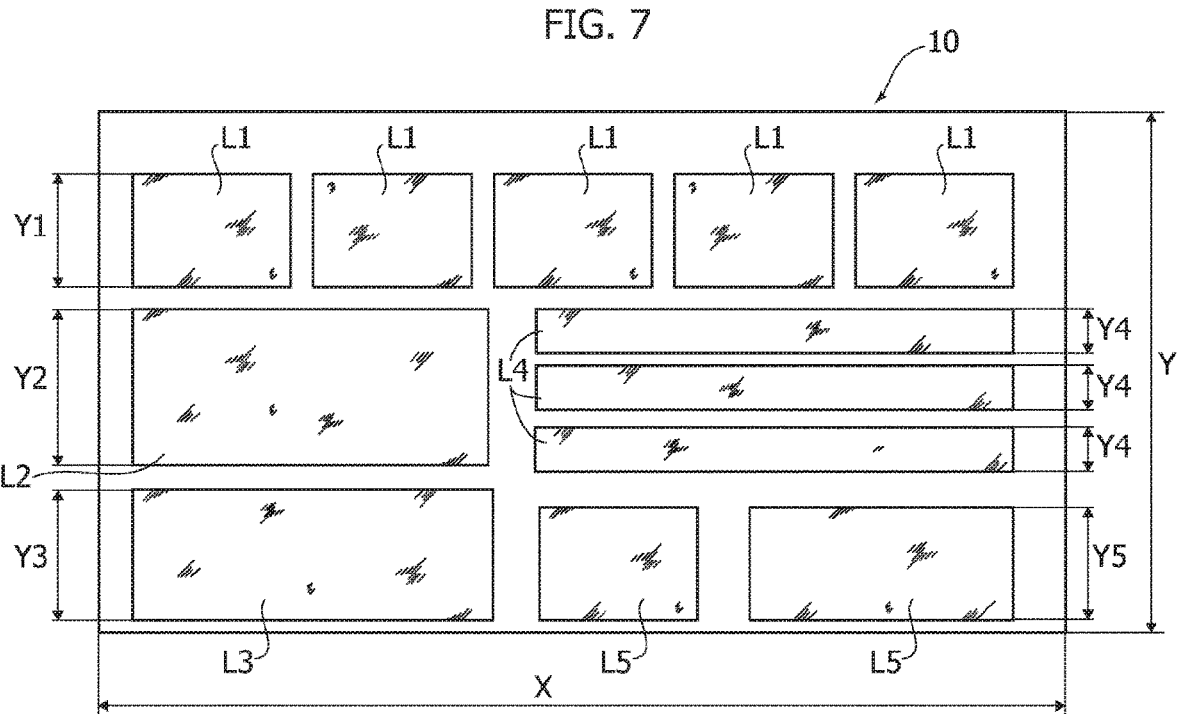

By way of example, FIG. 7 shows a distribution identical to that in FIG. 6, except that on the row of glass plates L3 there are arranged plates L5 with a transverse dimension Y5 smaller than Y3 (in an actual example Y5 was 750 mm).

Figure 8:
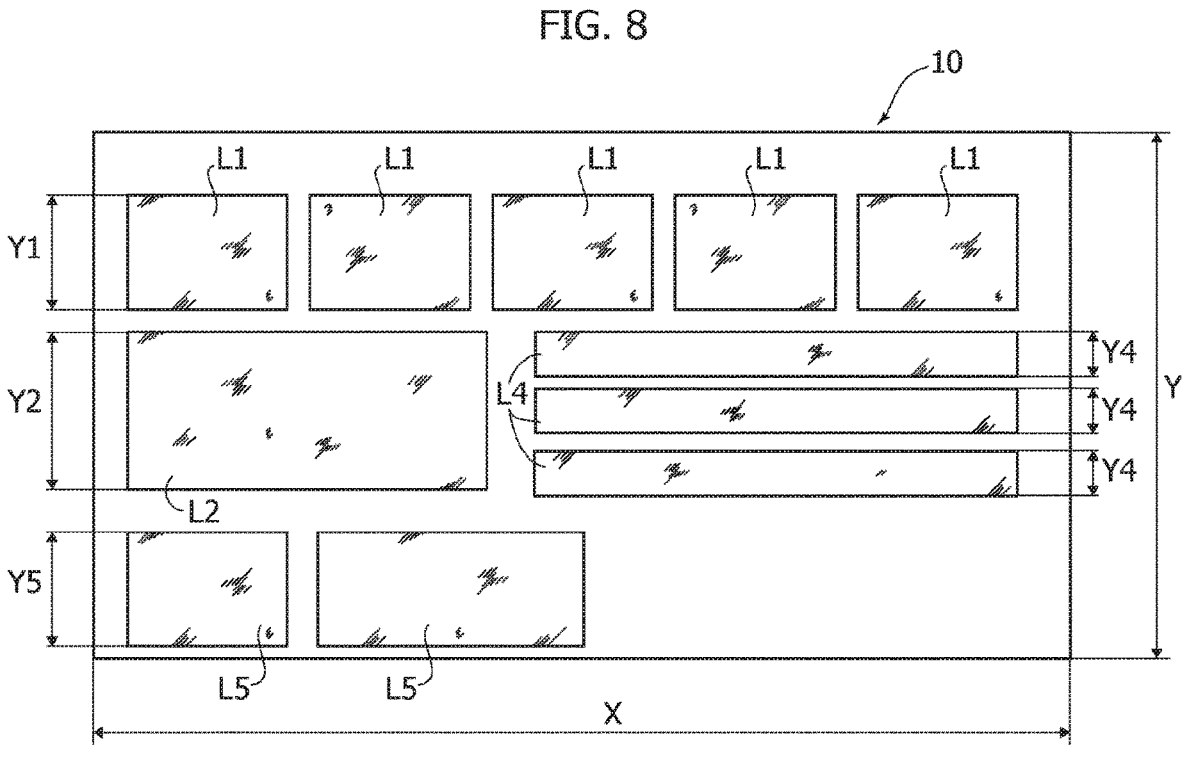

To achieve this condition, first the plates L5 are positioned, as illustrated in FIG. 8, for example by activating only three belt conveyors 24 on which the L5 plates are supported. Subsequently, the plate L3 is transferred as in FIG. 7, for example by activating a fourth belt conveyor 24, on which the plate L3 also rests, in addition to the three belt conveyors already activated to transport the plates L5. The final positioning of the plates L5 and L3 is thus obtained by driving the aforementioned four belt conveyors at the same speed.

Figure 9:
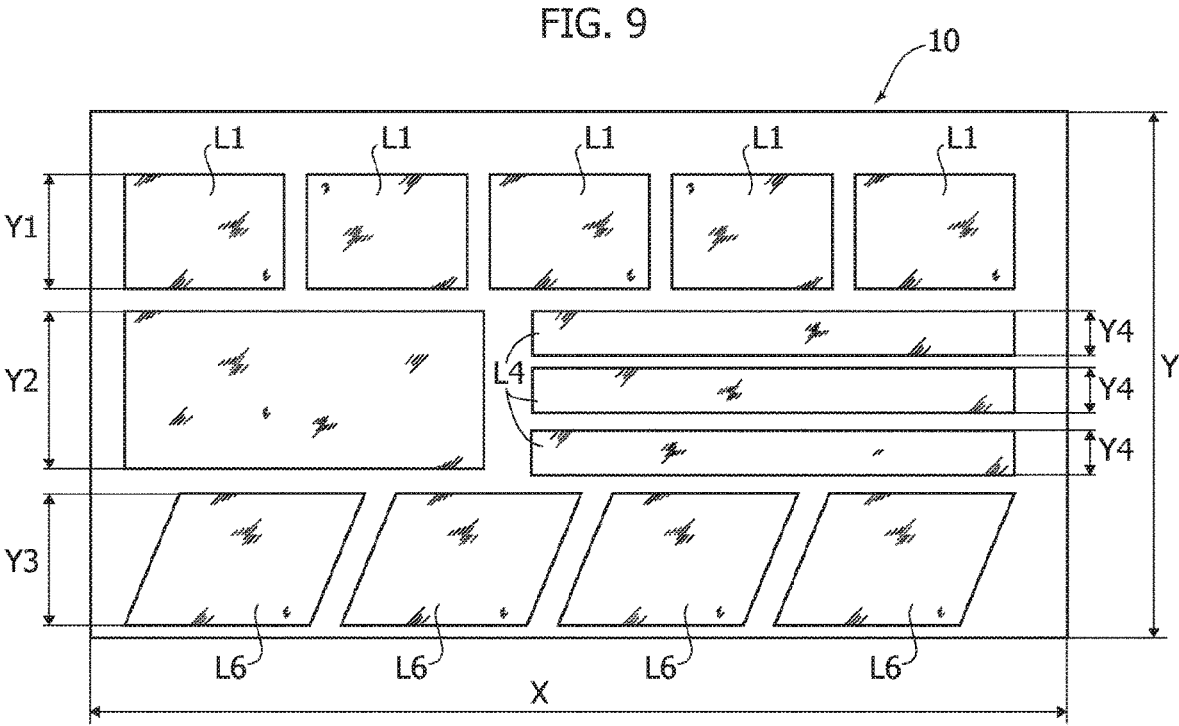

A third optimization criterion allows the positioning of shaped plates on the bench, enabling them to be kept adjacent to each other along the direction of the longitudinal dimension X of the table. By way of example, FIG. 9 shows a row of identical plates L6 with a parallelogram shape and oblique transverse sides. As illustrated, in this case the plates L6 may be arranged adjacent to each other, the distance between each plate L6 and the other being less than the space occupied in the X direction by each oblique side of the plates.

As can be seen from the foregoing description, the optimization bench according to the invention provides a number of relevant advantages:

first of all, the bench allows the automatic arrangement of a plurality of plates on the bench, distributing them in such a way as to make maximum use of the available area (for example up to a percentage of 85% or more), depending on the type and size of the plates.

the above result is achieved by extremely simple and economical means, in particular due to the fact that the different belt conveyors can be driven even by a single electric motor, the selective activation of the belt conveyors being achieved by controlling the electrically operated clutches associated with them, the configuration of each belt conveyor and its associated drive train is such as to allow each individual belt conveyor to be removed, for maintenance or replacement, with extremely simple and rapid operations, the loading of the plates onto the bench 10 can also be done manually, but preferably it is automated, in the manner described above, the optimization of the occupation of the available area also allows a reduction (even up to 50%), for a same total area of the plates, of the footprint of the optimization bench compared to a traditional system.

Naturally, without prejudice to the principle of the invention, the embodiments and the construction details may vary widely with respect to what has been described and illustrated by way of example only, without departing from the scope of the present invention, as defined in the appended claims.

The invention claimed is:

1. An optimization bench for glass plates, comprising:

a base conveyor means carried by the base and configured to support a plurality of glass plates over an area of the bench that is to be occupied and to move the plates in a longitudinal direction of the bench in order to distribute the plates over the area available on the bench, and drive means, controlled by an electronic controller, for selectively driving said conveyor means by coordinating the movements of the plates on the bench, in such a way as to arrange the plates in positions suitable to obtain an occupation of the area available on the bench, said conveyor means comprising a plurality of belt conveyors parallel to each other, extending in the longitudinal direction of the bench and each belt conveyor of said plurality of belt conveyors comprising a belt and two end pulleys engaged by the belt and rotatably supported by the base, said plurality of belt conveyors being configured to support and transport the glass plates in the longitudinal direction of the bench, said drive means comprising common motor means for said plurality of belt conveyors and a transmission system operatively interposed between said motor means and said plurality of belt conveyors, said transmission system comprising a plurality of electrically operated clutches respectively associated with the plurality of belt conveyors and selectively operable by said electronic controller to control the movement of respective belt conveyors of said plurality of belt conveyors, such that each belt conveyor of said plurality of belt conveyors can be activated by said common motor means independently of other belt conveyors of said plurality of belt conveyors, by activation of the respective clutch, and said electronic controller being configured to transport each plate by activating only supporting belt conveyors of said plurality of belt conveyors on which the plate is supported.

2. Bench according to claim 1, wherein the belt conveyors have the respective end pulleys each rotatably supported by supports which are removably connected to the base, so that the entire assembly of each belt conveyor of the plurality of belt conveyors is separable from the bench for maintenance operations or for a replacement, by a sliding movement in the longitudinal direction of the bench.

3. Bench according to claim 1, wherein:

the belt conveyors have traction pulleys arranged at a same end of the bench, each of the traction pulleys is part of a pulley assembly comprising said traction pulley, a drive pulley, coaxially mounted to the traction pulley, and a respective electrically operated clutch of the plurality of electrically operated clutches, coaxially interposed between the traction pulley and the drive pulley, the drive pulleys associated with the belt conveyors being connected by a plurality of respective transmissions to a drive shaft which is driven by said motor means, the drive shaft extending transversely to the longitudinal direction of the bench.

4. Bench according to claim 3, wherein said motor means comprise a single electric motor rotatably driving a single drive shaft which drives said drive pulleys via a plurality of respective belt transmissions, each of the drive pulleys being able to drive the traction pulley of the respective belt conveyor by activation of the respective electrically operated clutch.

5. Bench according to claim 3, wherein:

each of the traction pulleys is rigidly mounted on a shaft which is rotatably supported by the base, the respective drive pulley is freely rotatably supported on said shaft of said traction pulley, said clutch interposed between the traction pulley and the drive pulley has a first portion rotationally connected to the shaft of the traction pulley and a second portion rotationally connected to the drive pulley and is configured to rotationally connect said first portion with said second portion when the clutch is activated.

6. Bench according to claim 5, wherein said shaft of the traction pulley, on which the respective drive pulley and the respective clutch are mounted, is rotatably mounted on supports which are removably connected to the base.

7. Bench according to claim 1, wherein said electronic controller is configured to simultaneously actuate selected groups of said belt conveyors, as a function of the transverse dimension of each plate to be transported, in such a way that each plate is transported by actuating only the belt conveyors on which the plate is supported.

8. Bench according to claim 7, wherein said electronic controller is configured to receive an information on the size and position of a plurality of plates which are placed on the bench in differentiated positions along the transverse direction of the bench, and to advance each plate placed on the bench by actuating only the belt conveyors on which it is supported, until the plates are arranged on the bench in parallel longitudinal rows, in which the plates forming each row all have a same predetermined transverse dimension or a transverse dimension smaller than said predetermined transverse dimension.

9. A plate transport system, comprising the bench according to claim 1, a plate loading system upstream of the bench and a plate unloading system downstream of the bench, for forwarding plates positioned on the bench to a subsequent station.

10. Method for positioning a plurality of glass plates on an optimization bench by occupying the area available on the bench, said method comprising the steps of:

providing an optimization bench including a base and conveyor mean carried by the base and configured to support a plurality of glass plates over an area of the bench that is to be occupied and to move the plates in a longitudinal direction of the bench in order to distribute the plates over the area available on the bench, and selectively operating, by means of driving means under the control of an electronic controller, said conveyor means, coordinating the movements of the plates on the optimization bench in such a way as to arrange the plates in positions suitable to obtain an occupation of the area available on the bench, said conveyor means comprising a plurality of belt conveyors parallel to each other, extending in the longitudinal direction of the bench and each comprising a belt and two end pulleys engaged by the belt and rotatably supported by the base, said belt conveyors being configured to support and transport the glass plates in the longitudinal direction of the bench, said drive means comprising common motor means for said belt conveyors and a transmission system operatively interposed between said motor means and said belt conveyors, said transmission system comprising a plurality of electrically operated clutches respectively associated with the belt conveyors, and selectively operable by said electronic controller to control the movement of respective belt conveyors of the belt conveyors, such that each belt conveyor of the belt conveyors is operable by said common motor means independently of other belt conveyors of the belt conveyors, by activation of the respective clutch, and wherein each plate is conveyed by activating, by means of the electronic controller, only supporting belt conveyors of the belt conveyors on which the plate is supported.

11. Method according to claim 10, further comprising a plate loading system arranged upstream of the bench, the loading system being controlled by the electronic controller to position plates on the bench in different positions with respect to the transverse direction of the bench, as a function of the transverse dimension of each plate, with reference to the condition in which the plate is resting on the bench, and in that the electronic controller advances each plate placed on the bench by operating only the belt conveyors on which the plate is supported, until the plates are arranged on the bench in longitudinal rows parallel to each other, in which the plates forming each row all have the same predetermined transverse dimension or a transverse dimension smaller than said predetermined transverse dimension.

* * * * *